Apr. 24, 1923.
H. G. KNAPP
PLOWLIFT
Filed Feb. 9, 1921
1,452,744
2 Sheets-Sheet 2
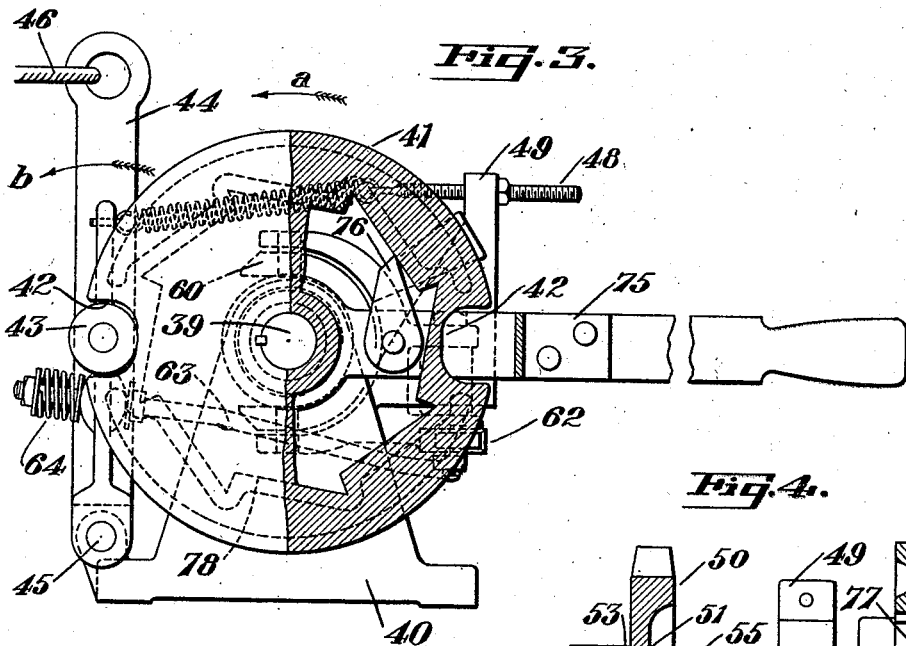
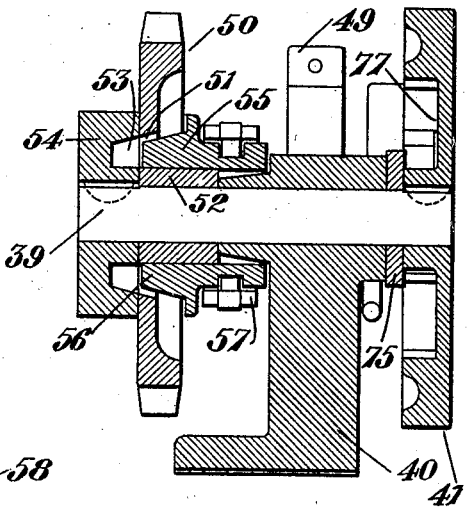
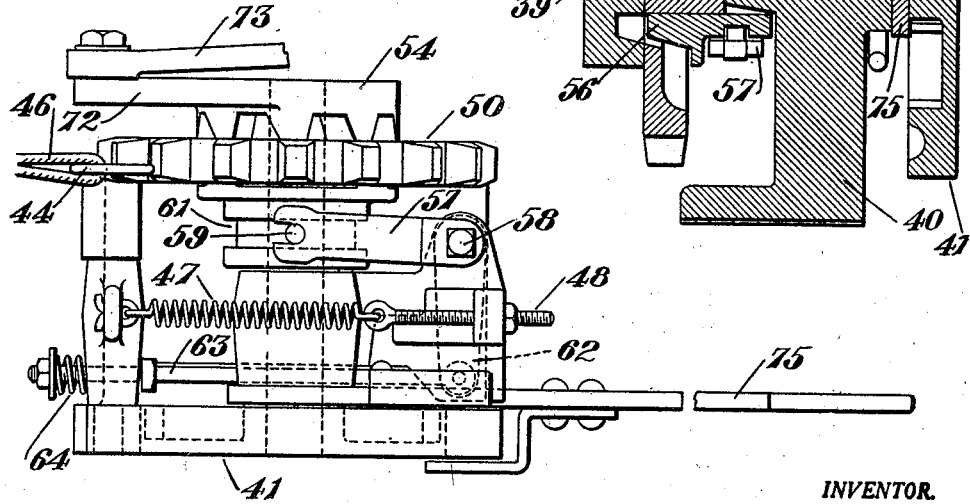
INVENTOR.
HORACE G. KNAPP
BY Chas. E. Townsend
ATTORNEY.

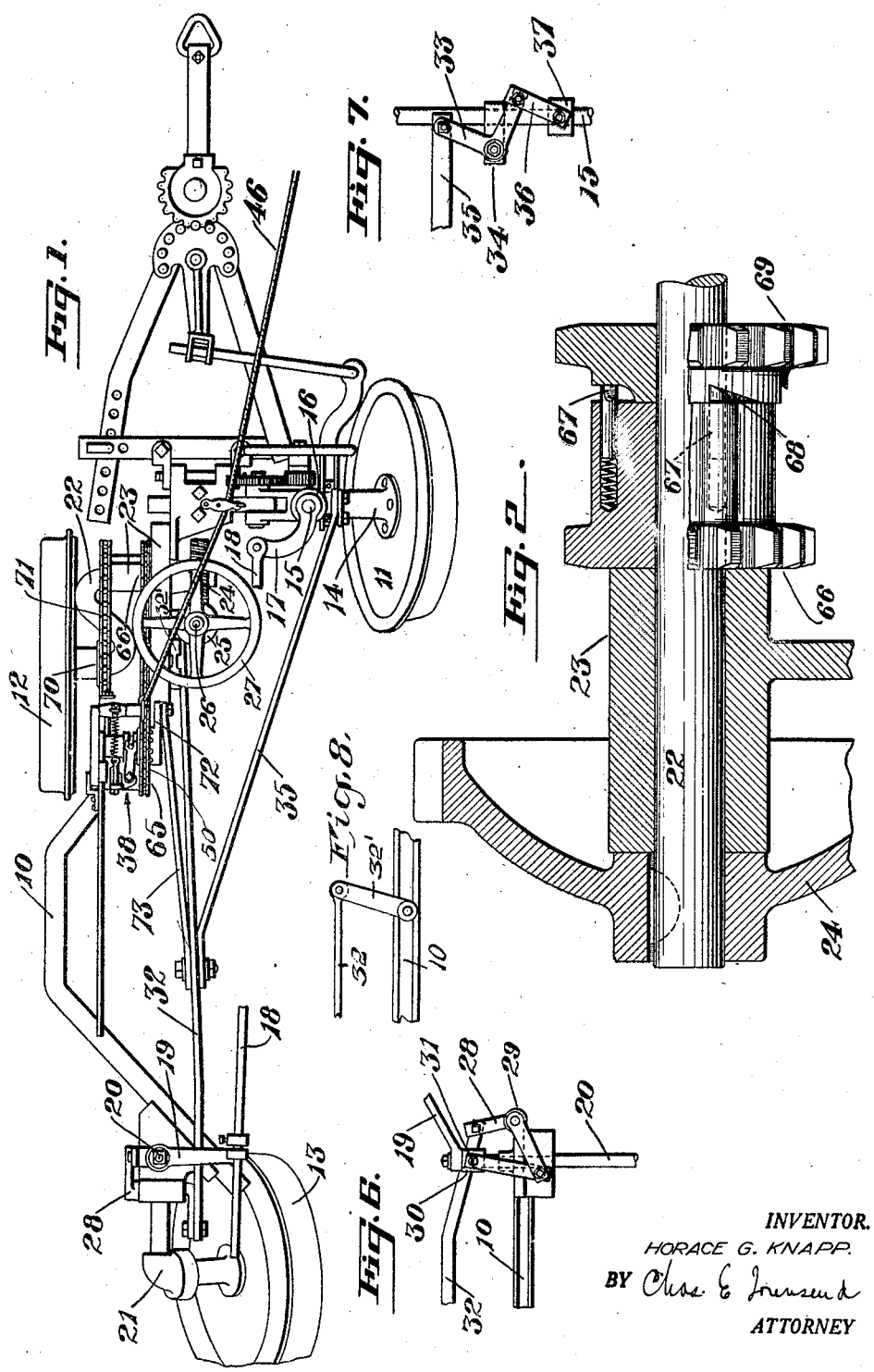

Patented Apr. 24, 1923.

1,452,744

UNITED STATES PATENT OFFICE.

HORACE G. KNAPP, OF SAN JOSE, CALIFORNIA, ASSIGNOR TO KNAPP PLOW CO., INC., OF SAN JOSE, CALIFORNIA, A CORPORATION OF CALIFORNIA.

PLOWLIFT.

Application filed February 9, 1921. Serial No. 443,534.

*To all whom it may concern:*

Be it known that I, HORACE G. KNAPP, a citizen of the United States, residing at San Jose, in the county of Santa Clara and State of California, have invented new and useful Improvements in Plowlifts, of which the following is a specification.

This invention relates to a plow lift, and particularly pertains to agricultural implements of the class shown in copending applications Serial Numbers 301671 and 404295, filed June 4, 1919, and August 18, 1920, respectively.

It is the principal object of the present invention to provide a plow lift adapted to be used in connection with gang plows and which will act to raise and lower the plow as the implement advances, said raising and lowering mechanism being provided with improvements which are the subject matter of the present invention, and by which the lift mechanism may be readily thrown into and out of operation as desired.

The present invention contemplates the use of lifting means adapted to be optionally connected with power transmission members to cause the frame of the vehicle to raise and lower relative to the running gear, said lifting mechanism being equipped with means for manually lifting the frame if desired, and other means whereby the implement may be backed along its course of travel without placing undue stress upon the lifting mechanism.

The invention is illustrated by way of example in the accompanying drawings, in which:

Figure 1 is a view and plan illustrating the present invention as applied to a gang plow.

Fig. 2 is an enlarged view in section and elevation showing the clutch mechanism by which backing of the plow is permitted without damage.

Fig. 3 is a view in elevation showing the power lift with parts broken away to more clearly disclose its construction.

Fig. 4 is a view in central section through the power lift showing the mounting thereof and the various elements of which it is composed.

Fig. 5 is a view in plan, showing the complete power lift.

Fig. 6 is a fragmentary view of the rear wheel lifting link mechanism.

Fig. 7 is a similar view of the front wheel lifting link mechanism.

Fig. 8 is a frangmentary view disclosing the connection between one of the drag links and the frame.

Referring more particularly to the drawings, 10 indicates a plow main frame adapted to support a plurality of disk plows. The main frame is provided with a running gear comprising a front wheel 11, a side wheel 12, and a rear wheel 13. Front wheel 11 is preferably inclined to the vertical, and is mounted upon a spindle structure 14. This structure is fitted with a vertical shaft 15, properly housed within bearings 16 on the forward end of frame 10. The upper end of this shaft is equipped with a lever 17, secured to a link 18, which link extends rearwardly and connects with a lever 19, secured to vertical shaft 20 disposed at the rear of frame 10. This shaft has a rearwardly extending crank portion 21, upon which the wheel 13 is mounted, and by which mechanism the wheels 11 and 13 are caused to swing in unison in a manner to track on an arcuate course. The wheel 12 is preferably mounted on a Z shaped axle 22, one end of which axle carries a wheel 12, while the other end extends through bearings 23 on the main frame. This axle extends rearwardly and downwardly from the bearing 23, and it will be evident that if the axle is swung forwardly and downwardly, the frame of the vehicle will be elevated.

The mechanism to produce the adjustment of axle 22 comprises a gear 24, fixed at the outer end of a portion of the axle extending through bearing 23, and in mesh with a gear 25, fixed to an operating shaft 26. This shaft extends vertically and may be rotated by hand wheel 27.

The adjustment for raising and lowering the rear end of the frame relative to the axle structure 20, consists of a bell crank 28, secured to a bracket 29 on the frame 10. The upwardly extending portion 20 of the rear axle is provided with a sleeve 30, held between fixed spacing collars on the shaft 20. One end of the bell crank 28 is pivotally connected by a pin 31 to the sleeve. The other end of the bell crank is fitted with a drag link 32, extending forwardly to the operating mechanism, which will be hereinafter explained. This link is supported for shifting movement at its forward end by a lever 32' as shown in Fig. 8.

In the present case, it is desirable to raise and lower the main frame at its forward end simultaneously with its rearward raising and lowering. This is accomplished by the use of a bell crank 33, secured to a bracket 34 on the forward end of the frame 10. The upper end of this bell crank is connected with a drag link 35, which extends rearwardly and is secured to the link 32. The lower end of the bell crank is fitted with a link 36 pivoted to a sleeve 37 on the vertical shaft 15, of the front axle spindle 14. By this arrangement it will be evident that simultaneous movement of the drag links 32 and 35 will swing the bell cranks 28 and 33, and will cause the frame of the implement to be raised and lowered relative to the wheels 11 and 13. This action is sufficient to insure that the disk plows shall be raised clear of the ground, thus allowing free manipulation of the implement.

The mechanism for actuating the drag links 32 and 35 and thus producing the lifting action of the frame, consists of the structure indicated generally at 38. This comprises the shaft 39, extending horizontally through a central bearing standard 40, secured to the frame, and within which the shaft is free to rotate. The outer end of the shaft is fitted with a lock disk 41. This disk is formed with a pair of diametrically opposite recesses 42, in its circumferential edge. These recesses are adapted to alternately receive a lock pin 43, carried by a releasing lever 44. This lever extends vertically and is pivoted to a standard 40 by pin 45. The lever is disposed at the forward side of the disk, and may be moved from its locking position by a trip cord 46, which is led forwardly to a tractor. A spring 47 is secured to the lever 44, at one end, and to an adjusting bolt 48 at its opposite end. This bolt extends through a vertical lug 49, carried upon the standard 40. The spring 47 may thus be tensioned by adjustment of the bolt 48 to cause the lever 44 and the pin 43 to be constantly drawn rearwardly in a manner to insure that the pin 43 will fall into one of the recesses 42 as it comes into register therewith. It will be understood that when the pin 43 is out of register with one of the recesses 42, the shaft 39 is free to rotate. It will be further evident that automatically the disk 41 and the shaft will be locked at each half rotation thereof. Driving action of the shaft 39 is brought about through a sprocket wheel 50, normally freely rotating relative to the shaft. This sprocket wheel is formed with the plurality of openings 51 formed through the body portion and adjacent its hub 52. These openings may register with similar openings 53 in a clutch disk 54, which is keyed to the end of the shaft 39. Slidably mounted upon the hub of the sprocket 50 is a jaw clutch member 55, one end of which is formed with a plurality of axially extending teeth 56, which teeth agree in number and substantially in sectional dimensions with openings 51, through the sprocket, and the recesses 53 in the clutch disk 54, thus by projecting the teeth 56 through the openings 51 and into engagement with the recesses 53, the sprocket will be keyed to the clutch disk 54 and will impart motion to the shaft 39.

The clutch member 55 is in the form of a sleeve freely slidable along hub 52, as shifted by the shifting fork 57. This fork is adapted to swing horizontally as it is mounted on a pivot bolt 58 carried by the standard 40. The ends of the forked arms are formed to engage pins 59 of a semicircular shoe 60. As shown in Fig. 3, this shoe partially circumscribes the clutch sleeve 55 and sits within an annular groove formed around the sleeve. The shifting fork 57 is swung by a lever arm 62 secured to the lower end of the pivot bolt 59, and connected with the lock lever 44 by means of a bolt 63. This bolt extends through the lock lever and is there fitted with a spring 64. This arrangement insures that when the lock lever is drawn forwardly, the shifting fork 57 will have a tendency to spring toward the sprocket 50. The shifting of the sleeve 55 cannot, however, take place until the teeth 56 thereon, are in register with the recesses 53 in the clutch disk 54. This inaccuracy in operation is taken care of by the spring 64 which will allow the lock lever to spring and yieldably hold the clutch teeth against the flat face of the clutch disk 54 until they do come within register with the recesses, and will then force these teeth in locking relation thereto.

The sprocket 50 is constantly driven during the forward or backward movement of the wheel 12. This driving action is brought about by sprocket chain 65, led around a sprocket wheel 66, which member is freely rotatably upon the upper horizontal axle extension of the axle 22. The outer end of the hub of sprocket 66 is provided with a plurality of yieldable clutch dogs 67 which extend axially and project into clutch recesses 68, formed in the adjacent face of a sprocket 69. This sprocket is also freely mounted on the upper portion of axle 22. The hub of the wheel 12, carries a sprocket 70, which is fixed to rotate with the wheel and constantly drives the sprocket 69 through a chain 71, which driving action is utilized in the power lift.

In operation of the present invention, the implement is assembled as shown in the drawings. When the vehicle advances, rotation of the sprocket 69 will take place, and due to the square shoulder at the rear of the recesses 68 on the hub thereof, the dogs 67 will be positively engaged and the sprocket 66 caused to rotate in unison therewith. This motion will cause the sprocket 50 to rotate in the direction of the arrow —a— in Fig. 3. The sprocket 50 will run idle, carrying the clutch sleeve 55 therewith, until it is desired to raise the plow. The operating cable 46 is then drawn forwardly and the lock lever 44 is swung in direction of the arrow —b— and against the tension of spring 47. Pin 43 will thus be withdrawn from the recess 42 within which it was seated, and at the same time the clutch sleeve 55 will tend to shift toward the clutch disk 54, through the operation of bolt 63, lever 62, and shifting lever 57, when the teeth 56, of the clutch 55 move into register with the recesses 53 of the disk 54. The spring 64 will force them into driving position. This will lock the disk 54 to the sprocket 50. The shaft will then rotate, as well as the lock disk 41. As shown in Fig. 1, the lock disk 54 carries a lever arm 72, which is connected to the drag links 32 and 35 by a bar 73. This will allow the drag links to be drawn or pulled, as determined by the position of the lever 72, when power is applied thereto. If it is moved in one direction, the bell cranks 28 and 33 will act to lift the main frame, and when moved in the opposite direction will act to lower the main frame relative to the running gear. In either event, the raising or lowering action will be produced in a half revolution of the shaft 39 and the lock disk 41, and as the spring 47 is yieldably holding the pin 43 against the circumferential edge of the lock disk, it will force the pin into a recess 42 when it moves into register therewith, thus locking the disk, simultaneously permitting lever 44 to be restored to its original position and thereby swinging the clutch sleeve 55 from its position of engagement with the disk 54.

In the event that the vehicle backs, the moving mechanism will remain inoperative even though it has been tripped. This is due to the fact that the rearward movement of the sprocket 69 will cause the dogs 67 to ride out of the recesses 68 and prevent unison rotation of the sprockets 66 and 69.

It will thus be seen that the power lift mechanism here disclosed is simple in operation, automatically acting to raise and lower the plow frame as the implement advances, and without operation as the implement backs, and at the same time provides for an automatic action to restore the plow lift to its original inoperative position after one cycle of its performance.

It will be understood that at certain times it is necessary to raise or lower the frame when the plow cannot be moved along the ground. For that purpose a manually operating device is provided. This consists of a lever arm 75, which is fitted with a dog 76. The lever arm is freely mounted around the shaft 39, and carries the dog on its outer face so that this member will be within the recess 77 in the face of the lock disk 41. The circumferential edge of this recess is formed by the plurality of inverted ratchet teeth 78, which may be engaged by the dog, and when the lever 75 is lifted will produce the desired rotation of the lock disk and the shaft 39.

While I have shown the preferred form of my invention as now known to me, it will be understood that various changes might be made in the combination, construction and arrangement of parts by those skilled in the art, without departing from the spirit of the invention as claimed.

Having thus described my invention, what I claim and desire to secure by Letters Patent, is:

1. In combination with the main frame of a plow having front, rear and side ground wheels mounted thereon whereby the frame may be raised or lowered relatively thereto, of a power lift for said frame comprising an operating shaft, a clutch disk fixed thereon, a sprocket wheel operatively connected to the side wheel whereby it will be continuously driven when the plow is being moved along the ground, a sliding clutch member on the shaft adapted when actuated to lock said sprocket to said fixed clutch disk, said disk having a crank arm, mechanism associated with the front and rear wheels adapted to raise or lower the frame relative thereto when actuated, and operative connection between said mechanism and said arm on the clutch disk whereby swinging movement of the arm will actuate said mechanism, a lever pivoted to the frame, an operative connection between said lever and said sliding clutch member whereby movement of the lever in one direction will actuate the clutch to lock the sprocket to the shaft thereby imparting swinging movement to the arm to actuate the lifting mechanisms, and automatically operating means associated with said shaft and said lever and operating to cause the lever to disengage the clutch and lock the shaft against rotation each time said shaft has traversed a half revolution.

2. In combination with the main frame of plow having front, rear and side wheels, said front and rear wheels having axles with vertical extensions upon which the frame is mounted whereby the frame may be raised or lowered relatively to the wheels, the side wheel having a Z-shaped axle with a horizontal portion journal on the frame, said axle being turnable whereby the frame may be raised or lowered relatively to said wheel, a sprocket fixed to the hub of said side wheel and operatively connected to a sprocket freely mounted on said horizontal portion of the axle, a driven sprocket also freely mounted on said axle adjacent the first named, a one-way clutch mechanism between said sprockets whereby they will rotate in unison only when the plow is drawn forwardly, an operating shaft, a sprocket freely mounted thereon and operatively connected to the driven sprocket, an extending arm fixed on the shaft, a sliding clutch member on the shaft and operable to lock said sprocket to said shaft to rotate the same, lift mechanism associated with the axles of the front and rear wheels and the frame to raise or lower the latter relative to wheels and axles, and operative connection between said lift mechanisms and said extending arm where movement of the arm will actuate the said mechanisms, a lever pivoted to the frame and operatively connected to the sliding clutch member to actuate the same, an automatically operating mechanism associated with the lever and the shaft and normally tending to maintain the latter stationary and whereby shifting of the lever in one direction will simultaneously permit the shaft to rotate and actuate the clutch and means co-operating with said mechanism whereby release of the lever will disengage the clutch and lock the shaft against rotation when the latter has traversed a half revolution.

3. In combination with the main frame of a plow having front, rear and side wheels, said front and rear wheels having axles with vertical extensions upon which the frame is mounted whereby the frame may be raised or lowered relatively to the wheels, bell crank levers pivoted to the frame adjacent each of said axles, one end of said bell cranks being connected to each other by drag links, links connecting the other ends of said bell cranks to said axles whereby shifting movement of the drag links will actuate the bell cranks to raise or lower the frame, an operating shaft, a disk fixed thereon having diametrically opposed notches, a lock lever having means thereon normally adapted to engage said notches to hold said shaft stationary, internal ratchet teeth formed in said disk, a second lever pivoted to the shaft and having a pawl engageable with said teeth, whereby the lever may be oscillated to rotate said disk when said lock lever is released, and an arm fixed to the shaft and operatively connected to said drag links whereby the frame may be raised or lowered relative to the wheels by rotating said shaft.

4. In combination with the main frame of a plow having front, rear and side wheels, lifting mechanisms associated with each of said wheels, said mechanisms being operatively connected, an operating shaft, an arm secured thereon and connected to said mechanisms whereby turning movement of the shaft will operate the same, a disk having diametrically opposed notches secured on the shaft, a lock lever pivoted to the frame and having means normally in engagement with one of said notches whereby to maintain the shaft stationary, an operating lever pivoted to the shaft, internal ratchet teeth formed in said disk, a pawl on said lever adapted to cooperate with the teeth when the lever is oscillated to rotate the shaft when said lock lever is disengaged from the disk.

5. In combination with the plow frame, the running gear and the lifting mechanisms associated with the front and rear wheels, of a sprocket fixed on the hub of the side wheel, a pair of sprockets freely mounted on the axle, one being operatively connected with the sprocket fixed on the side wheel, a clutch interposed between the sprockets on the axle whereby the second sprocket will be driven by the first named sprocket when the running gear is in forward motion, an operating shaft, a sprocket freely mounted thereon, an operative connection between said sprocket and the driven sprocket on the axle, a clutch adapted when actuated to lock the sprocket on the operating shaft thereto whereby the shaft will be rotated, a disk fixed on said shaft having a pair of diametrically opposed notches, an operating lever having protrusion normally engaging one of said notches and securing the shaft against rotation, a yieldable connection between said lever and the clutch whereby actuation of said lever will release the shaft and engage the clutch, a crank arm fixed to said shaft, and an operative connection between said arm and the lifting mechanisms, and an internal ratchet formed in said disk, and a lever carrying a pawl engaging said ratchet whereby the shaft may be rotated when the running gear is stationary.

HORACE G. KNAPP.